United States Patent [19]

Warner

[11] Patent Number: 4,489,290

[45] Date of Patent: Dec. 18, 1984

[54] CIRCUITRY FOR CONTROLLING THE REFLECTED TORQUE ON A GENERATOR DRIVEN BY A FLUID METER

[75] Inventor: Richard C. Warner, Morris Plains, N.J.

[73] Assignee: The Singer Company, Stamford, Conn.

[21] Appl. No.: 469,559

[22] Filed: Feb. 25, 1983

[51] Int. Cl.³ .......................... H02J 7/00; H02P 9/00
[52] U.S. Cl. ...................................... 322/35; 320/53; 320/61; 322/95
[58] Field of Search .................... 320/2, 39, 57, 61; 322/1, 35, 7, 8, 89-93, 28, 29; 290/43, 52, 54

[56] References Cited

U.S. PATENT DOCUMENTS

| | | |
|---|---|---|
| 2,148,804 | 2/1939 | Claytor . |
| 3,086,160 | 4/1963 | Loftus . |
| 3,646,422 | 2/1972 | Hankley . |
| 3,750,001 | 7/1973 | McCloskey ...................... 290/43 X |
| 3,921,052 | 11/1975 | Milano ............................. 322/35 X |
| 4,061,451 | 1/1978 | Rouse ..................................... 322/1 |
| 4,122,381 | 10/1978 | Sturm ................................ 320/61 X |
| 4,369,373 | 1/1983 | Wiseman ......................... 290/43 X |

Primary Examiner—R. J. Hickey
Attorney, Agent, or Firm—David L. Davis; Robert E. Smith; Edward Bell

[57] ABSTRACT

The output of an electrical generator driven by a meter is coupled to a load through circuitry for limiting the reflected forces placed on the meter.

7 Claims, 2 Drawing Figures

CIRCUITRY FOR CONTROLLING THE REFLECTED TORQUE ON A GENERATOR DRIVEN BY A FLUID METER

DESCRIPTION

1. Background of the Invention

This invention relates to generator control circuits and, more particularly, to such circuits for use where the generator is driven by a fluid meter.

There are a number of applications where a fluid meter is utilized to drive an electrical generator. For example, in the situation where a meter is placed in a gas pipeline in a remote location and the meter is equipped with a battery operated electronic correcting device, it is desirable to utilize rechargeable batteries and provide a generator coupled to an output shaft of the meter. This generator is then utilized to feed a battery charging circuit connected to the rechargeable battery. However, it has been found that if the charging circuitry is coupled directly to the output of the generator, a significant disadvantageous effect occurs. This effect is increased inaccuracy at low flow rates through the meter.

Meter inaccuracy at low flow rates comes about because of loading forces placed upon the meter by friction within the meter itself and by whatever load is driven by the meter. As the flow rate of the gas increases, the ability of the meter to produce output torque on a rotating output shaft increases. In fact, the increase is a function of the square of the velocity. Accordingly, when the flow rate of the gas reaches some threshold percentage of the meter rating, the loading forces placed on the meter are inconsequential and the meter accuracy is stable. It would therefore be desirable not to place any additional load on the meter below this threshold flow rate.

When an electrical generator is coupled to a prime mover through a rotating shaft, the movement of the generator structure, per se, places a load on the prime mover. Connecting the output of the generator to an electrical load increases the loading forces placed on the prime mover. Accordingly, it is a primary object of the present invention to provide circuitry for connecting the output of a meter driven generator to an electrical load only at such time as the driving capability of the meter is sufficient to handle the increased electrical load while maintaining stable accuracy of the meter within acceptable limits.

2. Summary of the Invention

The foregoing and additional object are attained in accordance with the principles of this invention by providing an arrangement for coupling the output of a meter driven generator to an electrical load, which arrangement includes a voltage threshold device which only allows current to flow from the output of the generator when the output voltage of the generator, which is a measure of the flow rate through the meter, is above a predetermined value which insures that the meter is operating in a region of stable and acceptable accuracy.

BRIEF DESCRIPTION OF THE DRAWINGS

The foregoing will be more readily apparent upon reading the following description in conjunction with the drawings wherein.

DETAILED DESCRIPTION

Figure 1:
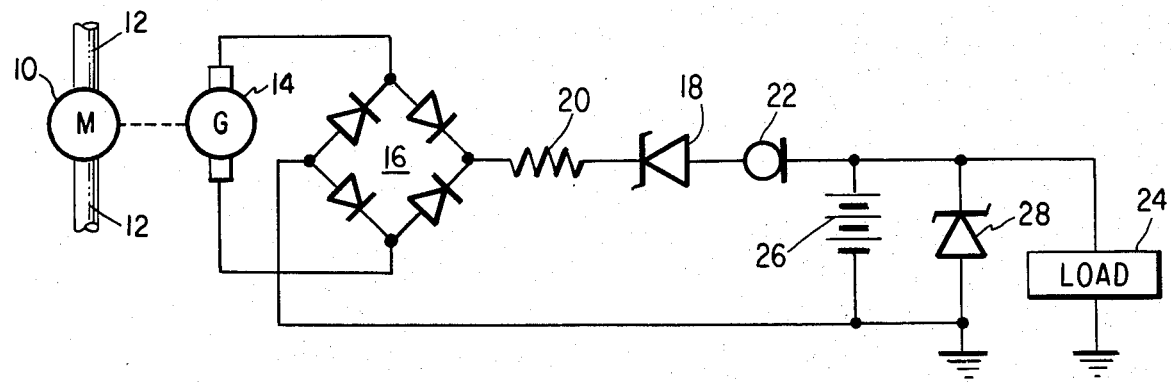
FIG. 1 is a schematic diagram of illustrative circuitry operating in accordance with the principles of this invention.

Referring now to the drawings, FIG. 1 shows a fluid meter 10 connected in a conduit 12 for measuring the volume of fluid flowing through the conduit 12. The meter 10 may be of any known type. For example, if the conduit 12 is a gas pipeline, the meter 10 may be a diaphragm meter, a rotary meter or a turbine meter. The only qualification to the meter 10 for use with the present invention is that it be fitted with a rotating output shaft through which it may be coupled to an electrical generator 14. The generator 14 produces an output AC voltage wherein the frequency and peak voltage levels are both linearly proportional to the rotational speed of the output shaft of the meter 10, which in turn is directly related to the rate of flow through the conduit 12. The output of the generator 14 is applied to a full wave diode bridge rectifier 16 which converts the AC output of the generator 14 to full wave rectified DC, in which the frequency is now double that of the generated AC but still bears the linear relationship to the speed of the output shaft. The useful voltage at the output of the bridge 16 is diminished by the drop in the bridge 16, which drop is a function of both current flow and the particular diodes used for forming the bridge 16. Further, there will be some very slight distortion of the waveform at the output of the bridge 16 due to non-linearities of the diodes forming the bridge 16 at very low current drains. (In a similar manner, a DC generator and a series diode can replace the AC generator and the bridge rectifier).

Until there is a flow of current, the circuitry to the right of the bridge 16 does not produce any loading forces on the generator 14 which are reflected back to the meter 10. To insure that such forces are not reflected back to the meter 10 until such time as the meter 10 is operating at some point where such forces are inconsequential to the accuracy of the meter 10, in accordance with the principles of this invention a zener diode 18 is provided in series connection with the output of the diode bridge 16. There is further provided a resistor 20 and a current regulator diode 22 in series with the zener diode 18. A current regulator diode, sometimes referred to as a field effect diode or a current zener, is a device that provides a regulated, virtually constant, current flowing therethrough over a range of voltage applied thereacross. These three elements 18, 20 and 22 provide a controlled current profile for the output of the generator 14 bridge 16 combination which, first, limits the forces reflected back to the meter 10 and, second, provides a regulated current for the load 24 and the rechargeable battery 26. The load 24 may be any conventional peripheral device associated with the meter 10, such as an electronic volume corrector, which is powered either from the rechargeable battery 26 or directly from the output of the bridge 16 when the meter is driven at a sufficient speed.

The zener diode 18 will prevent any meaningful current flow in the circuit until the output voltage of the generator 14 passes a peak value that is greater than the summation of the drop across the bridge 16, the drop across the zener diode 18 and the drop across the battery 26. Since the voltage drops across the bridge 16 and the battery 26 are virtual constants, selection of a particular zener diode 18 will determine the voltage output from the generator 14 which corresponds to a particular percentage of the full scale speed of the output shaft of the meter 10. While the current flow in the circuit is zero, there will be no reflected forces on the meter 10 caused by the circuitry.

Once current begins to flow in the circuit, and before it reaches the limit allowed by the current regulator diode 22, the increase in current flow will be controlled by the increase in speed of the meter 10 and the value of the resistor 20. Current flow at this time will increase linearly relative to meter speed. The current regulator diode 22 will pass the increasing generated current until this current reaches the limit value for the current regulator diode 22, at which time current flow will be clamped and all further increases of output voltage from the generator 14 in response to increased meter speed will show up as opposed drops across the current regulator diode 22. Current so produced will both trickle charge the rechargeable battery 26 and operate the load 24. The battery 26 will function as a voltage regulator for the load 24. When the current provided through the current regulator diode 22 is below that needed to operate the load 24, the additional current is supplied by the battery 26. The zener diode 28 placed across the battery 26 prevents overcharging of the battery 26 and abnormally high voltages from being applied to the load 24 in the event that any part of the battery path opens.

Figure 2:
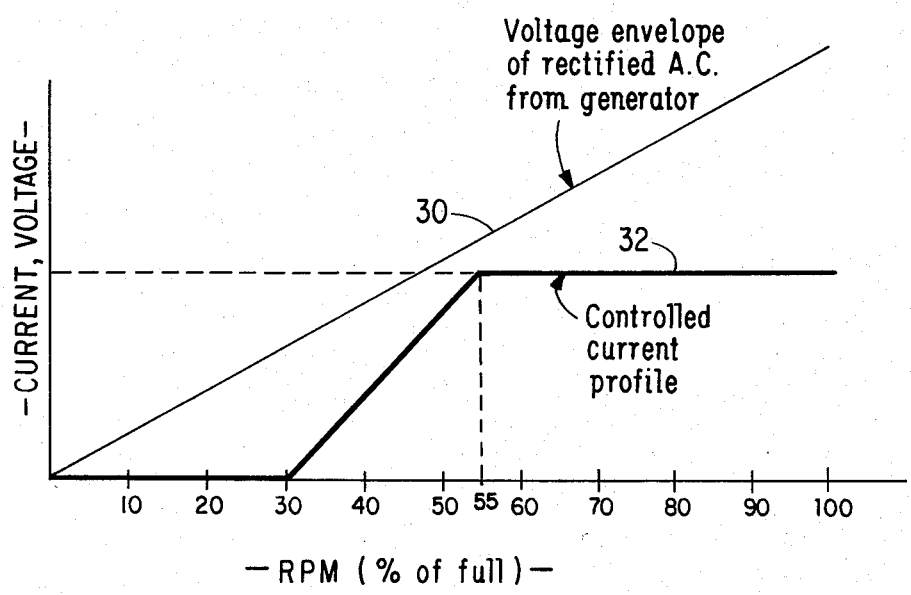
FIG. 2 graphically depicts the controlled current profile as a function of meter speed for the circuitry shown in FIG. 1.

FIG. 2 illustrates the controlled current profile described above as a function of speed of the meter 10. The line 30 shows the voltage envelope of the peak of the output of the bridge 16. This envelope is substantially a straight line function of the speed of the meter 10. The curve 32 shows an illustrative controlled current profile where the zener diode 18 has been selected to permit current to flow when the speed of the meter 10 is at approximately 30% of its maximum speed, corresponding to a flow rate of 30% of the rating of the meter 10. Additionally, curve 32 shown in FIG. 2 is for the case where the resistor 20 has been selected to permit the regulated value of current to flow when the speed of the meter 10 is at 55% of its maximum. Above 55% of the maximum speed of the meter 10, the current is clamped to a value which is a function of the current regulator diode 22. It is to be noted that unless a filter capacitor or choke is used in the circuit, the actual flow of current will be in the form of pulses in synchronism with the full wave rectified DC output of the bridge 16, but with the current peaks limited by the current profile 32.

Accordingly, there has been disclosed an arrangement for limiting the loading forces applied to a meter driving an electrical generator. It is understood that the abovedescribed embodiment is merely illustrative of the application of the principles of this invention. Numerous other embodiments may be devised by those skilled in the art without departing from the spirit and scope of this invention, as defined by the appended claims.

I claim:

1. In combination with a fluid meter having a rotating output shaft coupled to drive an electrical generator, an arrangement for coupling the output of the generator to a load so that the generator is prevented from supplying output current at speeds of said output shaft below a predetermined threshold speed in order to limit the loading forces applied to said output shaft at those lower speeds, said arrangement comprising:
   rectifier means for rectifying alternating current to direct current, said rectifier means having an input and an output;
   means for connecting said rectifier means input to the output of said generator;
   threshold means connected to said rectifier means output for preventing the flow of current of said load when the voltage level at said rectifier means output is below a predetermined threshold voltage; and
   current limiting means coupled between said rectifier means output and said load for preventing the current flowing from said rectifier means output to said load from exceeding a predetermined limit value.

2. The arrangement according to claim 1 further including a resistor in series with said threshold means and said current limiting means to provide a linear slope to the rectifier means output current as the speed of said output shaft increases above said predetermined threshold speed.

3. The arrangement according to claim 2 wherein said threshold means comprises a zener diode.

4. The arrangement according to claim 2 wherein said current limiting means comprises a current regulator diode.

5. The arrangement according to claim 4 wherein said load includes a rechargeable battery.

6. The arrangement according to claim 5 further including a second zener diode connected across said rechargeable battery.

7. In combination with a fluid meter having an output shaft which rotates at a speed which is a direct function of the flow rate of fluid passing through said meter:
   an electrical generator coupled to said output shaft;
   a full wave diode bridge, said bridge having its input terminals connected across the output of said generator;
   a resistor;
   a zener diode;
   a current regulator diode;
   means for connecting said resistor, said zener diode and said current regulator diode in series, with said diodes having opposite polarities;
   means for connecting one end of said series connection to the output of said bridge; and
   means for connecting the other end of said series connection to a load.

* * * * *